United States Patent
Voss, III

(10) Patent No.: US 8,347,926 B2
(45) Date of Patent: Jan. 8, 2013

(54) PORTABLE FUEL DISPENSING SYSTEM

(75) Inventor: Frederick Voss, III, Fernandina Beach, FL (US)

(73) Assignee: Voss Intellectual Property, LLC, Fernandina Beach, FL (US)

( * ) Notice: Subject to any disclaimer, the term of this patent is extended or adjusted under 35 U.S.C. 154(b) by 363 days.

(21) Appl. No.: 12/789,537

(22) Filed: May 28, 2010

(65) Prior Publication Data

US 2010/0236658 A1 Sep. 23, 2010

Related U.S. Application Data

(63) Continuation-in-part of application No. 11/675,624, filed on Feb. 15, 2007, now Pat. No. 7,735,672, and a continuation-in-part of application No. 12/765,280, filed on Apr. 22, 2010.

(51) Int. Cl.
 *B65B 1/04* (2006.01)
 *F04B 33/00* (2006.01)
(52) U.S. Cl. ......... 141/323; 141/231; 222/608; 222/628
(58) Field of Classification Search ............ 141/59, 141/198, 231, 323; 222/608, 628
See application file for complete search history.

(56) References Cited

U.S. PATENT DOCUMENTS

| | | | |
|---|---|---|---|
| 3,253,430 A | 5/1966 | Piffath | |
| 3,635,264 A * | 1/1972 | Milburn | 141/291 |
| 4,480,470 A | 11/1984 | Tussing | |
| 4,491,247 A | 1/1985 | Nitchman et al. | |
| 4,602,599 A * | 7/1986 | Glagola | 123/179.9 |
| 4,630,749 A | 12/1986 | Armstrong et al. | |
| 4,676,390 A | 6/1987 | Harris | |
| D294,820 S | 3/1988 | Belletire | |
| 4,779,755 A | 10/1988 | Harris | |
| 4,795,096 A | 1/1989 | Smith et al. | |
| 4,886,089 A | 12/1989 | Gabrlik et al. | |
| 4,955,950 A | 9/1990 | Seiichi et al. | |
| 4,972,972 A * | 11/1990 | Goguen | 222/130 |
| 5,183,173 A | 2/1993 | Heckman | |
| 5,240,027 A | 8/1993 | Vertanen | |
| 5,244,021 A * | 9/1993 | Hau | 141/285 |
| 5,279,252 A | 1/1994 | Martelly | |
| 5,386,721 A * | 2/1995 | Alvizar | 73/114.42 |
| 5,507,324 A | 4/1996 | Whitley, II et al. | |
| 5,630,452 A | 5/1997 | Schmid et al. | |
| 5,667,113 A * | 9/1997 | Clarke et al. | 222/608 |
| 5,669,532 A * | 9/1997 | Dorow et al. | 222/401 |
| 5,720,328 A | 2/1998 | Ott | |
| 5,732,840 A | 3/1998 | Foltz | |
| 6,000,413 A | 12/1999 | Chen | |

(Continued)

*Primary Examiner* — Timothy L Maust
(74) *Attorney, Agent, or Firm* — Stephen E. Kelly; Rogers Towers, P.A.

(57) ABSTRACT

A portable fuel dispensing system comprises a fuel pump assembly, a conduit, and a fuel tank cap assembly. The dual line conduit permits vapor in an external fuel tank to be evacuated via a vapor line in the conduit and collected in the reservoir of the portable fuel container. The conduit and the fuel tank cap assembly comprise mating couplers having valves biased closed when disconnected from the mating coupler. In use, the fuel tank cap assembly is threaded to the external fuel tank, and the conduit coupler is connected to the cap coupler, forming a fluid-tight connection between the conduit and the fuel tank cap assembly. Thereafter, the external fuel tank is replenished by manipulating the pump assembly. The pump assembly further comprises release valves disposed in the pump body assembly to alleviate pressure differences between the reservoir of the portable fuel container and the external ambient pressure.

7 Claims, 11 Drawing Sheets

U.S. PATENT DOCUMENTS

| | | | |
|---|---|---|---|
| 6,056,140 A | 5/2000 | Muth et al. | |
| 6,068,163 A * | 5/2000 | Kihm | 222/189.1 |
| 6,082,392 A * | 7/2000 | Watkins, Jr. | 137/312 |
| 6,237,645 B1 | 5/2001 | Pountney | |
| 6,302,170 B1 | 10/2001 | Ott | |
| 6,305,357 B1 * | 10/2001 | Soukeras | 123/495 |
| 6,637,466 B2 | 10/2003 | Mills, Jr. | |
| 7,108,026 B2 * | 9/2006 | Luca | 141/231 |
| 7,163,034 B2 * | 1/2007 | Franks | 141/67 |
| 7,168,297 B2 | 1/2007 | Herzog et al. | |
| 7,293,587 B1 * | 11/2007 | Broberg | 141/389 |
| 7,793,801 B2 * | 9/2010 | Drummond | 222/179 |
| 8,100,302 B2 * | 1/2012 | Bonner | 222/401 |
| 8,201,588 B2 * | 6/2012 | Bonner | 141/59 |

\* cited by examiner

PORTABLE FUEL DISPENSING SYSTEM

This application is a continuation-in-part of U.S. patent application Ser. No. 11/675,624, filed on Feb. 15, 2007, now U.S. Pat. No. 7,735,672, and a continuation-in-part of U.S. patent application Ser. No. 12/765,280, filed on Apr. 22, 2010.

FIELD OF THE INVENTION

This invention relates to portable fuel dispensing devices, and, more particularly, to a vented, non-spill fuel dispensing system with a releasable coupling for filling a fuel tank, and a vapour retention means to capture and retain fuel vapours emitted during the fueling process.

BACKGROUND

A common problem with filling fuel tanks is that fuel can easily spill out, especially where fuel is being poured from a portable fuel container through a nozzle into the fuel tank of a portable, motorized machine, such as a chain saw, weed eater, hedge trimmer, blower, lawn mower, or the like. As fuel flows into the machine's tank, the fuel can splash out of the tank or overfill the tank, causing fuel to spill onto surrounding objects. This spillage can be dangerous due to the combustibility of the fuel. Additionally, fuel spills present environmental hazards and can damage surrounding equipment, paint, and other objects. Furthermore, noxious and dangerous fumes and vapours escape while the fuel is being poured from the portable reservoir into the machine's tank, and these fumes, which can be easily ignited, present a health hazard to persons operating the equipment.

There is a need for a self-contained, portable fuel dispensing system that facilitates transfer of fuel from a portable fuel storage container (e.g., fuel can) to a second fluid receiving vessel (e.g., an external fuel tank on equipment or a machine) in a manner which prevents escape and spillage of fuel in liquid or vapor form. The invention is directed to overcoming one or more of the problems and solving one or more of the needs as set forth above.

SUMMARY OF THE INVENTION

To solve one or more of the problems set forth above, in an exemplary implementation of the invention, a vented non-spill portable fuel dispensing system is provided. The portable fuel dispensing system comprises a fuel pump assembly, a conduit, and a fuel tank cap assembly. The pump assembly comprises a handle assembly, a cylinder assembly, and pump body assembly. The pump handle assembly comprises a handle, a rod, and a plunger valve assembly. The cylinder assembly is a tube or hose extending to the bottom of the fuel reservoir inside the portable fuel container. The pump body assembly comprises a cap assembly having a cap top, a cap middle, a cap bottom, a body seal.

The conduit is a flexible hose or tube capable of channeling fuel from the pump assembly to the external fuel tank. The conduit is attached at one end to the pump assembly by any means for attaching a flexible hose to a rigid pipe or tube. The opposite end of the conduit comprises a conduit coupler capable of coupling to the fuel tank cap assembly. The fuel tank cap assembly comprises a body, a cap coupler capable of mating with the conduit coupler, and a means for attaching the cap assembly to an external fuel tank.

In use, the fuel tank cap assembly is threaded to the external fuel tank. The conduit coupler is connected to the cap coupler, thus forming a fluid-tight connection between the conduit and the fuel tank cap assembly. Thereafter, the external fuel tank may be replenished by manipulating the pump assembly.

In another embodiment, the conduit coupler and the cap coupler further comprise self-sealing valve assemblies that are biased closed when disconnected from the mating connector. The valves open only upon a connection to the respective mating coupler.

In another embodiment, the portable fuel dispensing system has the capability of collecting and containing the fuel vapors that are emitted from the external fuel tank during the fueling process. In this embodiment, the conduit comprises a fuel line for dispensing the fuel, and a vapor line for recovering the vapor emitted from the external fuel tank. As the fuel is dispensed through the fuel line, the vapor from the external fuel tank is evacuated via the vapor line and collected in the reservoir of the portable fuel container. Thus, the external fuel tank can be filled without substantial risk of spilling fuel or losing harmful vapors.

In another embodiment, the fuel tank cap assembly further comprises an adaptor capable of accommodating multiple sizes of threaded neck openings of external fuel tanks. The adaptor can be fitted to the cap assembly, where the adaptor has a portion with male threads to mate with the female threads of the cap assembly, and a female threaded portion to mate with the male threads of the external fuel tank. The male threaded portion of the adaptor varies in size with different sizes accommodating the various sizes of openings on the external gas tank.

In another embodiment, the pump assembly further comprises release valves disposed in the pump body assembly to alleviate pressure differences between the reservoir of the portable fuel container and the external ambient pressure.

In another embodiment, the system further comprises a self-sealing filler cap assembly disposed within the body of the portable fuel container. The filler cap assembly opens when the tip of a fuel nozzle presses against the spring-loaded drive pin, thereby opening the valve. When the nozzle is removed, the valve automatically closes, preventing spillage and intrusion of unwanted foreign matter.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes, or proportions shown in the figures.

DETAILED DESCRIPTION

Referring to the Figures, various embodiments of an exemplary portable fuel dispensing system, and components thereof, are shown. A fuel dispensing system according to principles of the invention permits transfer of fuel from a portable fuel container, such as a gasoline canister, to an external fuel tank, such as the fuel tank of a portable motorized machine, in a sealed manner which prevents escape and spillage of vapors and liquid fuel. The embodiments disclosed herein are meant for illustration and not limitation of the invention. An ordinary practitioner will understand that it is possible to create other variations of the following embodiments without undue experimentation.

Figure 1:
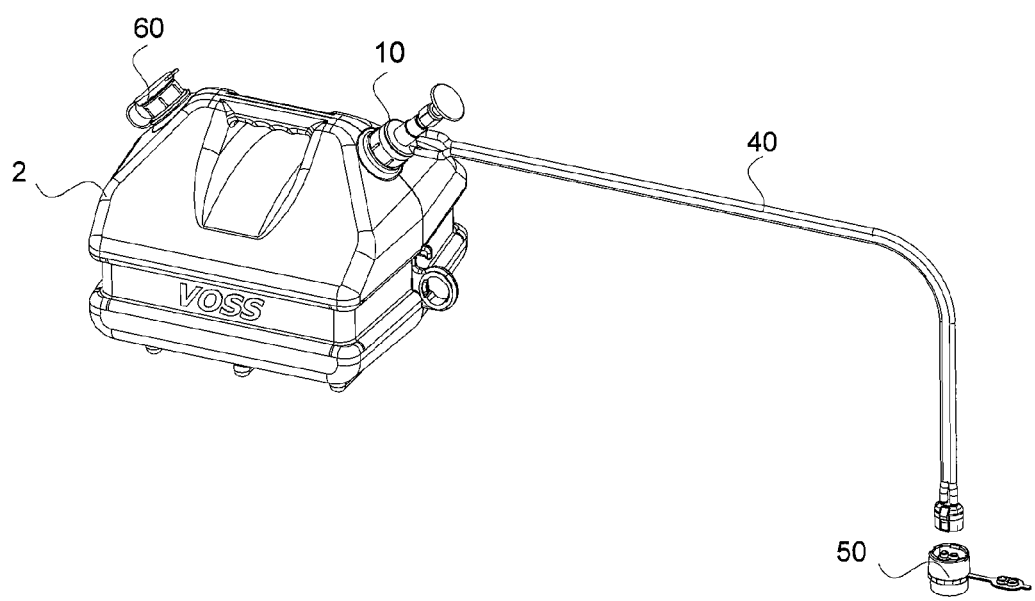
FIG. 1 shows an isometric view of one embodiment of a portable fuel dispensing system.
Figure 2:
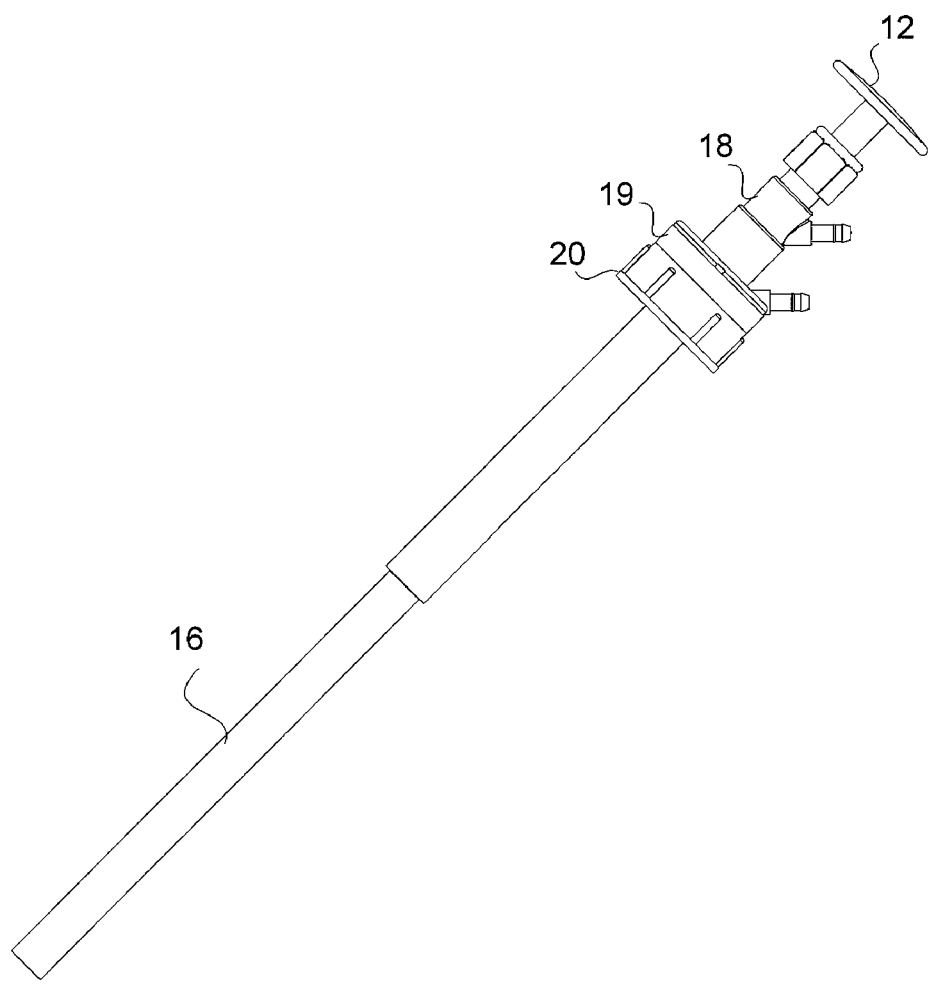
FIG. 2 shows a side view of an exemplary pump assembly.
Figure 3:
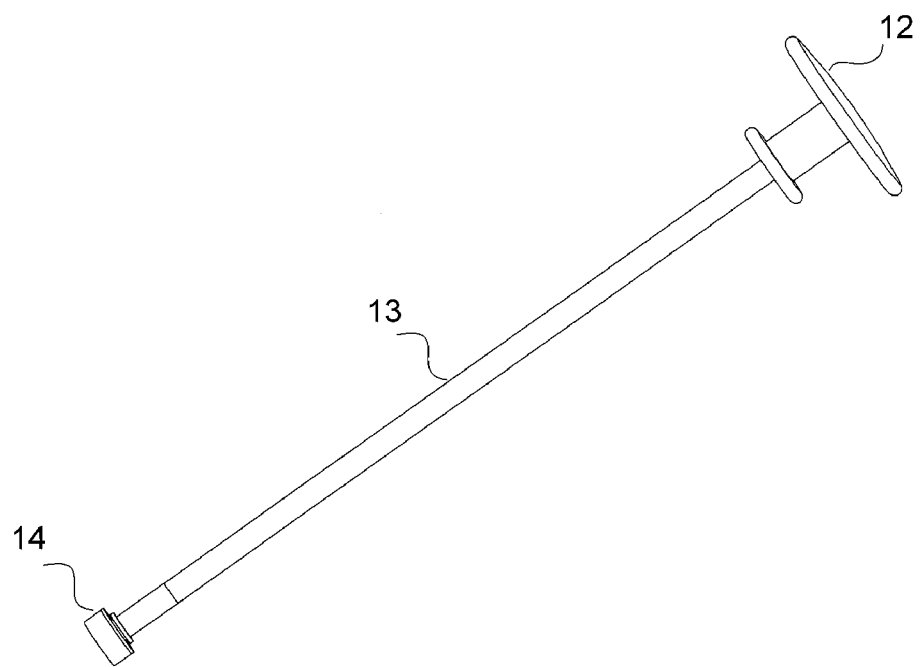
FIG. 3 shows a side view of a pump handle, rod, and plunger assembly.

Referring to FIG. 1, the portable fuel dispensing system comprises a fuel pump assembly 10, a conduit 40, and a fuel tank cap assembly 50. In FIGS. 2 and 3, the pump assembly 10 comprises a handle assembly 11, a cylinder assembly 16, and pump body assembly. The pump handle assembly 11 comprises a handle 12, a rod 13, and a plunger valve assembly 14. The cylinder assembly 17 is a tube or hose extending to the bottom of the fuel reservoir inside the portable fuel container 2. The pump body assembly comprises a cap assembly having a cap top 18, a cap middle 19, a cap bottom 20, a body seal 21.

Figure 4:
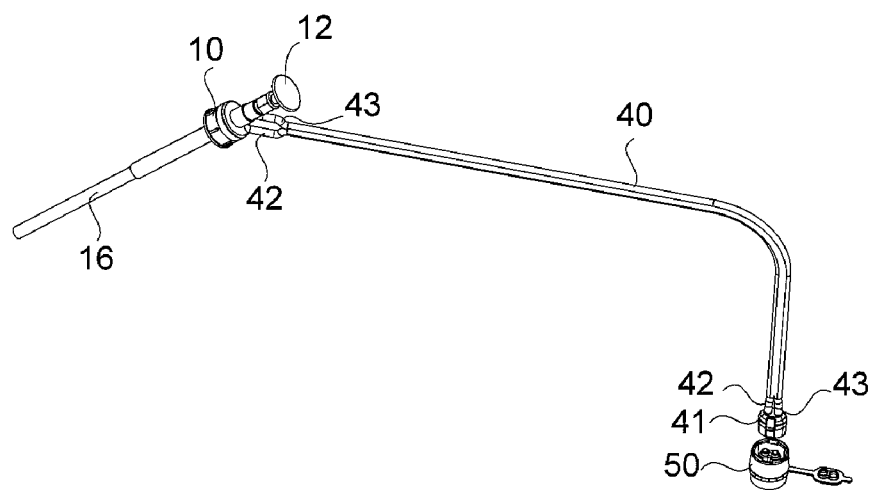
FIG. 4 shows an isometric view of a pump assembly connected to a conduit where the distal end of the conduit is shown near a fuel tank cap assembly.
Figure 5:
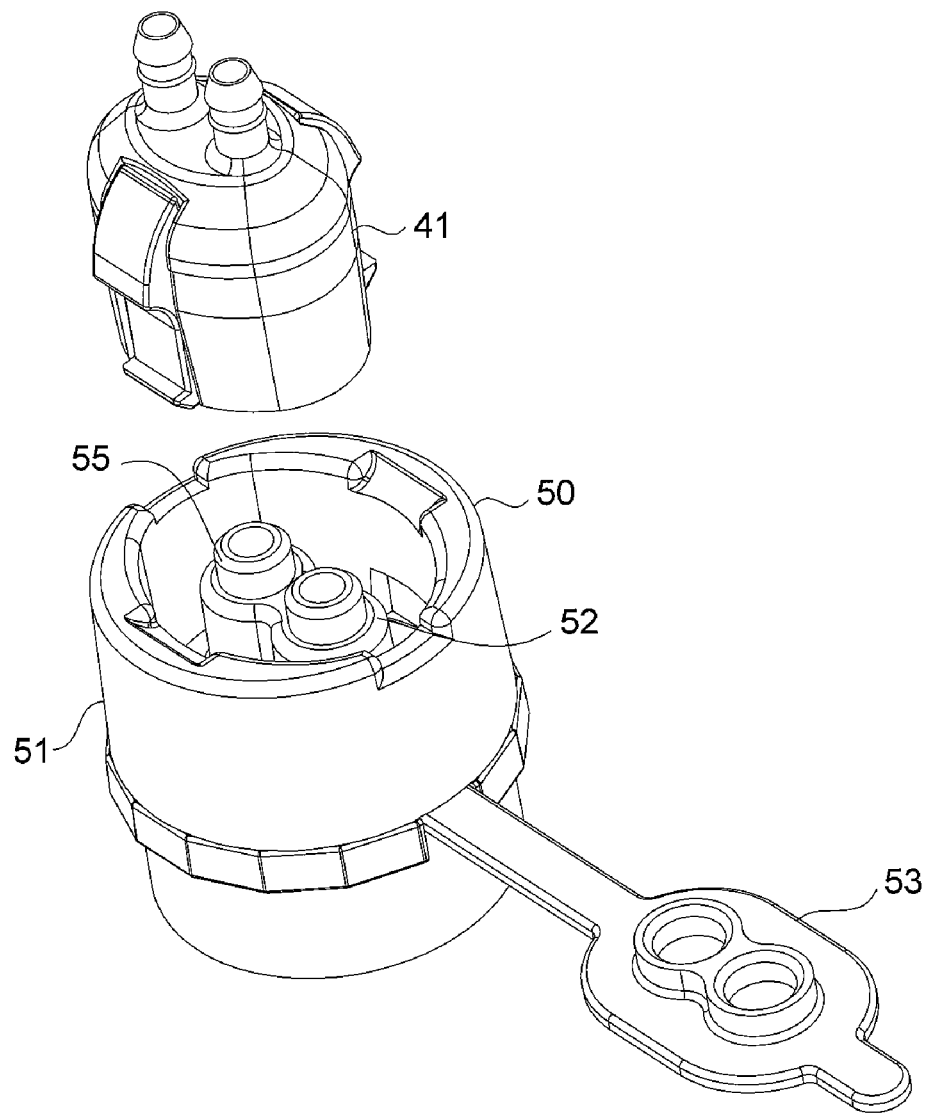
FIG. 5 shows a top isometric view of the conduit coupler disposed near the fuel tank cap assembly.
Figure 6:
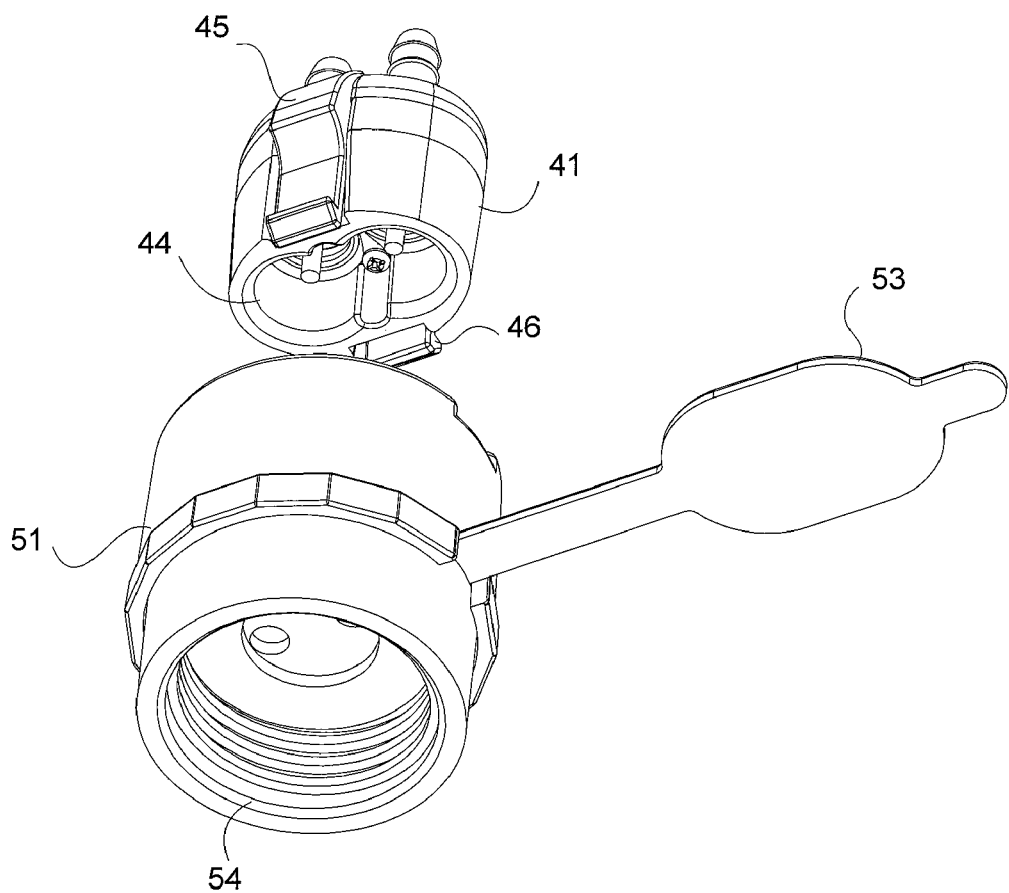
FIG. 6 shows a bottom isometric view of the conduit coupler disposed near the fuel tank cap assembly.

Referring to FIG. 4, the conduit 40 is a flexible hose or tube capable of channeling fuel from the pump assembly 10 to the external fuel tank. The conduit 40 is attached at one end to the pump assembly by any means for attaching a flexible hose to a rigid pipe or tube, such attachment means comprising a hose barb, a clamp, a clip, or the like. The opposite end of the conduit 40 comprises a conduit coupler 41 capable of coupling to the fuel tank cap assembly 50, as described below. Referring to FIGS. 5 and 6, the fuel tank cap assembly 50 comprises a body 51, a cap coupler 52 capable of mating with the conduit coupler 41, a cap dust cover 53, and a means for attaching the cap assembly to an external fuel tank. In many applications, the opening of the external fuel tank will comprise a protruding neck portion with male threads. Thus, in one embodiment of the fuel tank cap assembly 50, the body 51 comprises female threads 54 capable of mating with the male threads on the external fuel tank.

In use, the fuel tank cap assembly 50 is threaded to the external fuel tank 50, where it may replace the pre-existing fuel tank cap. After the cap dust cover 53 is removed, the conduit coupler 41 is connected to the cap coupler 52, thus forming a fluid-tight connection between the conduit 40 and the fuel tank cap assembly 50. Thereafter, the external fuel tank may be replenished by manipulating the pump assembly 10. As the pump handle 12 is manipulated, the rod 13 and plunger valve assembly 14 draw fuel from the portable fuel container 2 reservoir through the cylinder assembly 16 and into the conduit 40, where the fuel is channeled through the connected couplers and into the external fuel tank.

In another embodiment, the conduit coupler 41 and the cap coupler 52 further comprise self-sealing valve assemblies that are biased closed when disconnected from the mating connector. The valves open only upon a connection to the respective mating coupler. Thus, when the conduit 40 is detached from the cap assembly 50 upon completion of the fueling process, the valves in the conduit coupler 41 and the cap coupler 52 close automatically, thereby preventing spillage of fuel and vapors. In another embodiment, the conduit coupler 41 and the cap coupler 52 further comprise quick-disconnect capabilities. For example, the conduit coupler 41 can comprise one or more latches 45 capable of being partially depressed upon the user's hand pressure, and capable of returning to the undepressed position upon release of such pressure. The latch 45 can comprise a lip 46 capable of mating with a recess 47 in the cap body 51. Thus, the conduit coupler 41 can be inserted into the cap coupler 52 such that the lip 46 engages the recess 47, thus retaining the connectivity of the two couplers during the fueling process. Upon completion of the fueling process, the latch 45 can then be depressed to permit removal of the lip 46 from the recess 47, thus releasing the connectivity of the two couplers.

The embodiment disclosed herein is presented as one of many ways to accomplish the quick-disconnect coupling of the conduit 40 and cap assembly 50, and an ordinary practitioner will understand that other arrangements of quick-disconnect devices are achievable without undue experimentation. While quick disconnect couplings are preferred, the portable fuel dispensing system is not limited to such couplings. Instead, any releasable coupling that provides means for quickly and repeatedly connecting and disconnecting the conduit 40 to the cap assembly 50 without leakage and without introducing foreign matter into the external fuel tank may be utilized. In the preferred embodiment, the quick disconnect couplers members are capable of closing and sealing the respective apertures with which they are associated when the members are uncoupled from one another.

In another embodiment, the portable fuel dispensing system has the capability of collecting and containing the fuel vapors that are emitted from the external fuel tank during the fueling process. Generally, when a fuel tank is filled with fuel, vapors are emitted from the tank as the fuel enters the external tank. Referring to FIG. 4, in this embodiment of the portable fuel dispensing system, the conduit 40 comprises a fuel line 42 for dispensing the fuel, as described above, and a vapor line 43 for recovering the vapor emitted from the external fuel tank. Referring to FIGS. 5 and 6, the conduit coupler 41 comprises dual-line conduit receptacles 44 for receiving the fuel line 42 and vapor line 43. The fuel tank cap assembly 50 also comprises dual-line cap receptacles 55 capable of mating to the conduit receptacles 44, thus permitting the flow of fuel and vapor between the fuel container to the external fuel tank. As the fuel is dispensed through the fuel line 42, the vapor from the external fuel tank is evacuated via the vapor line 43 and collected in the reservoir of the portable fuel container. Thus, the external fuel tank can be filled without substantial risk of spilling fuel or losing harmful vapors.

Figure 7:
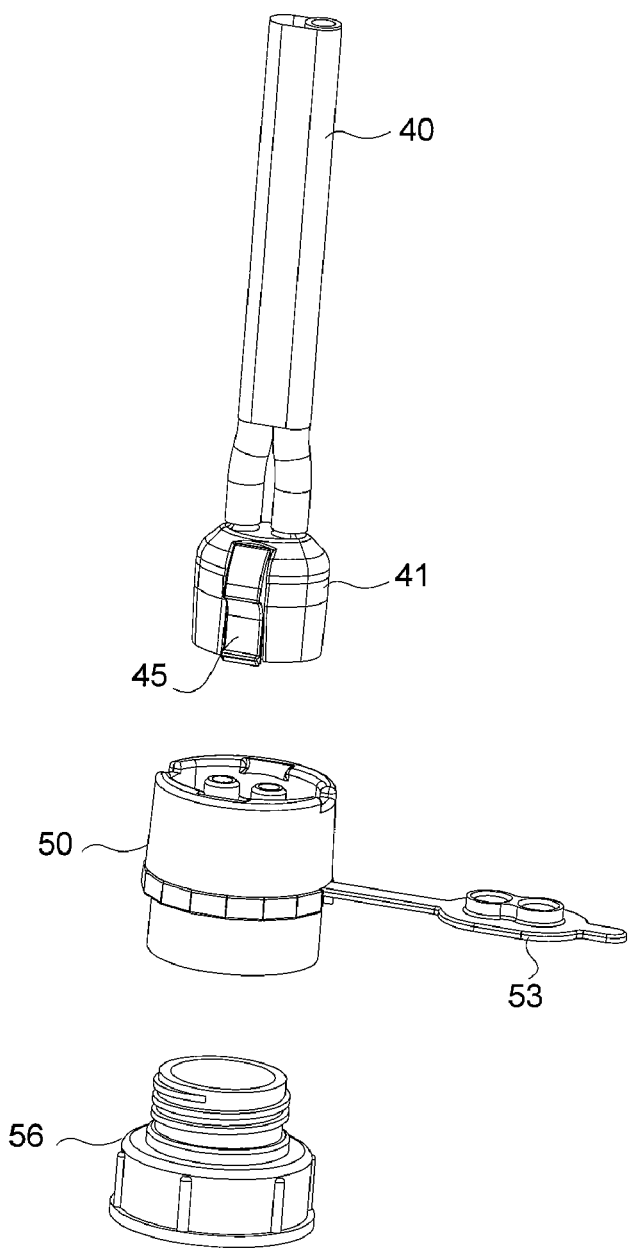
FIG. 7 shows a side view of a portion of the conduit, the conduit coupler, the fuel tank cap assembly, and the adaptor.

In another embodiment of the portable fuel dispensing system, shown in FIG. 7, the fuel tank cap assembly 50 further comprises an adaptor 56 capable of accommodating multiple sizes of threaded neck openings of external fuel tanks. The size of the threaded neck opening of the fuel tank will often depend on the type of machine to which it is attached, whether the machine be a lawn mower, weed eater, chain saw, hedge trimmers, or the like. Thus, an adaptor 56 can be fitted to the cap assembly 50, where the adaptor has a portion with male threads to mate with the female threads 54 of the cap assembly 50, and a female threaded portion to mate with the male threads of the external fuel tank. The male threaded portion of the adaptor 56 varies in size with different sizes accommodating the various sizes of openings on the external gas tank.

Multiple adaptors 56 may be used in combination where necessary. The adaptor 56 embodiment disclosed herein is presented as one of many ways to accomplish the accommodation of multiple sizes of gas tank openings, and an ordinary practitioner will understand that other arrangements of adaptors are achievable without undue experimentation.

Figure 8:
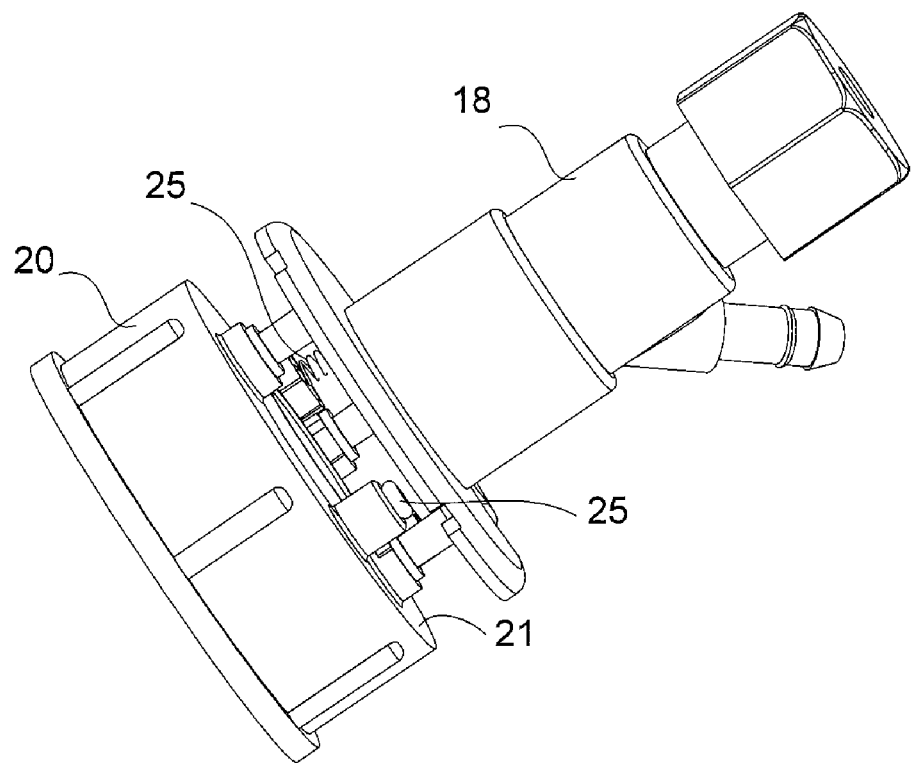
FIG. 8 shows a portion of the pump assembly where the cap middle has been removed to expose the release valves disposed within the pump assembly.

In another embodiment of the portable fuel dispensing system, shown in FIG. 8, the pump assembly 10 further comprises release valves 25 disposed in the pump body assembly. For example, the release valves 25 could be disposed within the pump body seal 21 or cap middle 19, as desired. The release valves 25 are one-way check valves capable of releasing gas, such as fuel vapors, when the gas reaches a predetermined pressure level. For example, in instances where pressure builds within the reservoir of the portable fuel container 2, the release valves 25 can automatically release the pressure before the pressure reaches a dangerous level. An opposite-facing release valve 25 can be used to alleviate external pressure when the pressure inside the reservoir of the portable fuel container 2 drops below that of atmospheric pressure. This embodiment of pressure release valves 25 is presented as one of many ways to accomplish pressure alleviation between the portable fuel container reservoir and the ambient environment, and an ordinary practitioner will understand that other arrangements of pressure release valves are achievable without undue experimentation.

Figure 9:
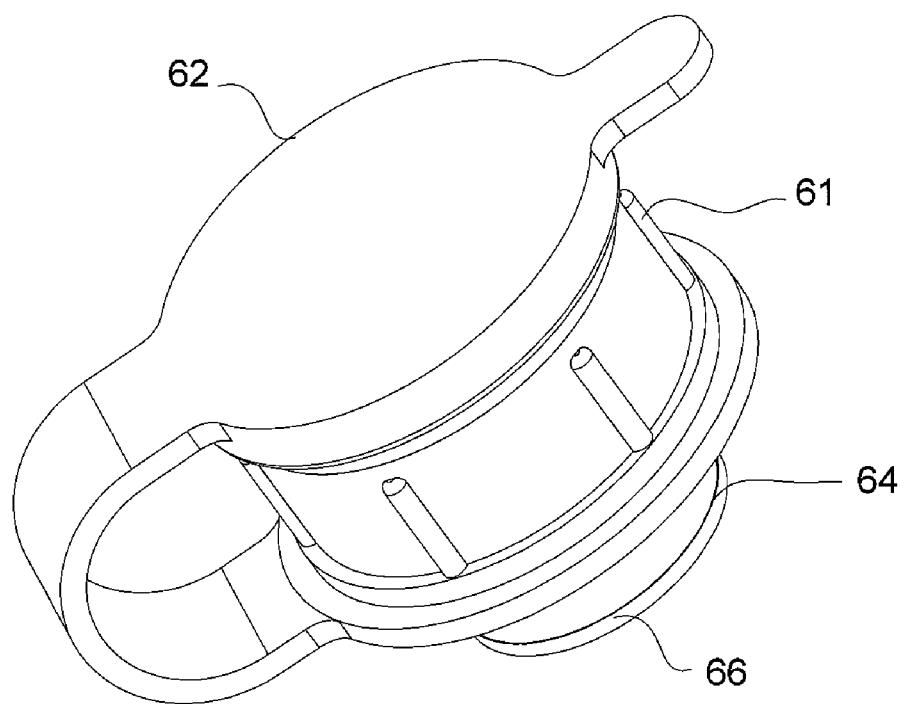
FIG. 9 shows an isometric view of a typical filler cap assembly.
Figure 10:
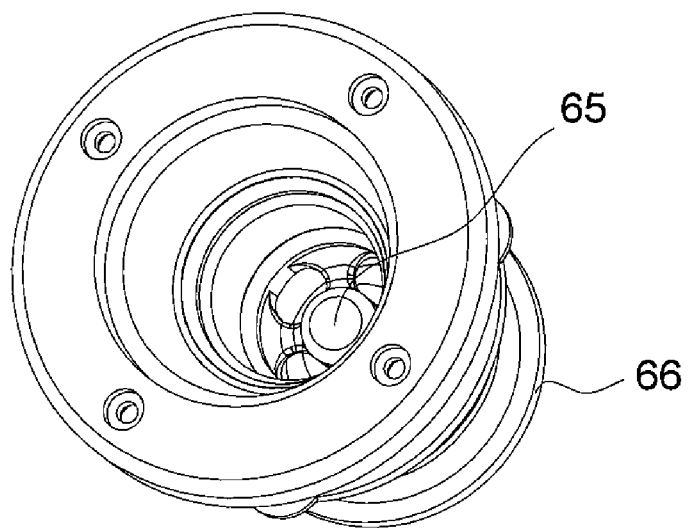
FIG. 10 shows an isometric view of the filler cap assembly with the dust cover removed to expose the opening where the fuel nozzle is inserted and pressed against the drive pin of the valve assembly.
Figure 11:
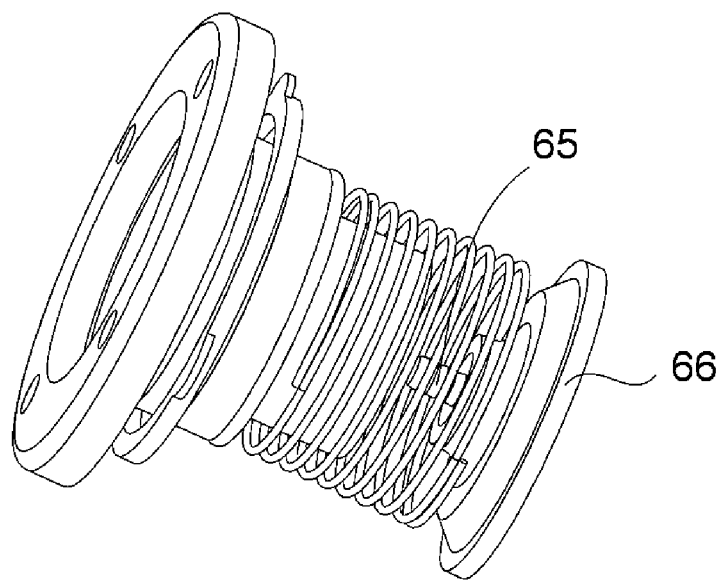
FIG. 11 shows a side view of the filler cap assembly where the valve body has been removed to expose the spring-loaded drive pin and the seal.

In another embodiment of the portable fuel dispensing system, shown in FIGS. 9-11, the system further comprises a self-sealing filler cap assembly 60 disposed within the body of the portable fuel container 2. The filler cap assembly 60 has a housing 61, a dust cover 62, and a valve having a valve body 64, a spring loaded drive pin 65, and a seal 66. When the portable fuel container 2 is not being filled, the spring attached to the drive pin 65 forces the seal 66 against the valve body 64, thereby creating a vapor tight seal. When the dust cover 62 is removed, a fuel nozzle can be inserted into the assembly such that tip of the nozzle presses against the drive pin 65, thus expanding the spring and separating the seal 66 from the valve body 64. The fuel can then flow out of the nozzle and into the portable fuel container 2 via the flow path created by separation of the seal 66 and the valve body 64. When the nozzle is removed, the spring draws the seal 66 back into contact with the valve body 64, thus resealing the portable fuel container 2. The dust cover 62 is then replaced to protect the valve assembly from unwanted intrusion of foreign material.

The foregoing embodiments are merely representative of the portable fuel dispensing system and not meant for limitation of the invention. For example, one having ordinary skill in the art would understand that many components described herein can be customized for specific applications by one having ordinary skill in the art. Consequently, it is understood that equivalents and substitutions for certain elements and components set forth above are part of the invention, and therefore the true scope and definition of the invention is to be as set forth in the following claims.

What is claimed is:

1. A portable fuel dispensing system comprising:
  a pump assembly disposed in a portable fuel container, said pump assembly capable of pumping fuel from the portable fuel container to an external fuel tank, wherein the pump assembly comprises a release valve capable of alleviating pressure differences between the inside of the portable fuel container and the outside atmospheric pressure;
  a fuel tank cap assembly having a cap coupler, said fuel tank cap assembly capable of removably attaching to a threaded neck opening of the external fuel tank;
  a conduit connected at one end to the pump assembly, said conduit capable of receiving fuel from the pump assembly and channeling the fuel through the fuel tank cap assembly coupled to the conduit, and dispensing the fuel into the external fuel tank, said conduit comprising a fuel line for dispensing fuel from the reservoir of the portable fuel container, and a vapor line for collecting and channeling vapor from the external fuel tank to the reservoir of the portable fuel container; and
  a conduit coupler disposed in the end of the conduit opposite that of the pump assembly, said conduit coupler capable of removably coupling to the cap coupler,
  wherein the conduit coupler further comprises quick-disconnect dual-line conduit receptacles, and the cap coupler further comprises quick-disconnect dual-line cap receptacles capable of mating with the dual-line conduit receptacles; and
  wherein the conduit coupler and the cap coupler further comprise valves that are biased closed when not connected to the mating coupler, said valves being opened upon connection to the mating coupler.

2. The portable fuel dispensing system of claim 1, wherein the system further comprises a self-sealing filler cap disposed in the body of the portable fuel container.

3. The portable fuel dispensing system of claim 1, wherein the cap coupler further comprises an adaptor capable of accommodating multiple sizes of the threaded neck opening of the external fuel tank.

4. The portable fuel dispensing system of claim 2, wherein the pump assembly further comprises release valves capable of alleviating pressure differences between the inside of the portable fuel container and the outside atmospheric pressure.

5. The portable fuel dispensing system of claim 3, wherein the pump assembly further comprises release valves capable of alleviating pressure differences between the inside of the portable fuel container and the outside atmospheric pressure.

6. The portable fuel dispensing system of claim 3, wherein the system further comprises a self-sealing filler cap disposed in the body of the portable fuel container.

7. The portable fuel dispensing system of claim 2, wherein the cap coupler further comprises an adaptor capable of accommodating multiple sizes of the threaded neck opening of the external fuel tank.

* * * * *